(12) United States Patent
Rupert et al.

(10) Patent No.: US 7,075,769 B2
(45) Date of Patent: *Jul. 11, 2006

(54) NEXT CONNECT ELECTRICAL RECEPTACLE ASSEMBLY

(75) Inventors: Brian K. Rupert, Kendallville, IN (US); Gavin L. Replogle, Kendallville, IN (US)

(73) Assignee: Pent Technologies, Inc., Kendallville, IN (US)

( * ) Notice: Subject to any disclaimer, the term of this patent is extended or adjusted under 35 U.S.C. 154(b) by 418 days.

This patent is subject to a terminal disclaimer.

(21) Appl. No.: 10/410,548

(22) Filed: Apr. 9, 2003

(65) Prior Publication Data

US 2003/0193243 A1 Oct. 16, 2003

Related U.S. Application Data

(60) Provisional application No. 60/371,467, filed on Apr. 10, 2002.

(51) Int. Cl.
*H01H 47/16* (2006.01)
(52) U.S. Cl. ...................................... 361/166; 361/160
(58) Field of Classification Search ................ 361/171, 361/172, 166, 152, 160; 307/42; 439/995; 340/656

See application file for complete search history.

(56) References Cited

U.S. PATENT DOCUMENTS

| | | | | |
|---|---|---|---|---|
| 4,175,238 A | * | 11/1979 | Breimesser et al. | 307/40 |
| 4,499,385 A | | 2/1985 | Slavik | 307/10 |
| 4,760,276 A | | 7/1988 | Lethellier | 307/18 |
| 5,208,485 A | | 5/1993 | Krinsky et al. | 307/41 |
| 5,359,540 A | * | 10/1994 | Ortiz | 307/115 |
| 5,424,903 A | * | 6/1995 | Schreiber | 307/40 |
| 5,436,788 A | | 7/1995 | Wallaert | 361/160 |
| 5,589,718 A | | 12/1996 | Lee | 307/72 |
| 5,604,385 A | | 2/1997 | David | 307/52 |
| 5,637,933 A | | 6/1997 | Rawlings et al. | 307/147 |
| 5,923,103 A | * | 7/1999 | Pulizzi et al. | 307/38 |
| 6,031,302 A | | 2/2000 | Levesque | 307/130 |
| 6,211,796 B1 | * | 4/2001 | Toms et al. | 307/147 |
| 6,815,842 B1 | * | 11/2004 | Fehd et al. | 307/40 |

* cited by examiner

*Primary Examiner*—Brian Sircus
*Assistant Examiner*—Andrew Deschere
(74) *Attorney, Agent, or Firm*—Taylor & Aust, P.C.

(57) ABSTRACT

An electrical assembly including a plurality of electrical modules, each of the plurality of electrical modules being sequentially electrically connected to at least one other of the plurality of electrical modules. Each of the plurality of electrical modules including a coding circuit, each of the coding circuits interacting to identify a number of the plurality of electrical modules that are sequentially electrically connected.

21 Claims, 3 Drawing Sheets

NEXT CONNECT ELECTRICAL RECEPTACLE ASSEMBLY

CROSS REFERENCE TO RELATED APPLICATIONS

This is a non-provisional application based upon U.S. provisional patent application Ser. No. 60/371,467, entitled "NEXT CONNECT", filed Apr. 10, 2002.

BACKGROUND OF THE INVENTION

1. Field of the Invention

The present invention relates to an electrical distribution system, and, more particularly, to an electrical distribution system, which limits the activation of more than a predetermined number of electrical receptacles.

2. Description of the Related Art

Electrical wiring codes limit the number of receptacles which can be sequentially connected. It is common for an electrical power source to be routed to an electrical receptacle and power then routed from that electrical receptacle to a subsequent electrical receptacle and this is continued for several electrical receptacles. While there is no physical limitation in wiring in this manner, there are electrical considerations such as contact resistance that may preclude the subsequent connection of electrical receptacles ad infinitum. An electrician can circumvent the electrical code by wiring too many receptacles in a sequential manner.

A method to prevent the connection of too many electrical receptacles is to key cables and connectors on electrical receptacles to thereby preclude the attachment of too many electrical receptacles in a single circuit. A disadvantage of this method is that numerous unique cables and receptacle connections must be made. This reduces flexibility and increases the amount of inventory items that need to be stocked.

What is needed in the art is a system that will limit the number of electrical receptacles in a single power circuit without relying on unique keyed connector cable systems.

SUMMARY OF THE INVENTION

The present invention provides an electrical power distribution assembly for use in a modular wall panel system.

The invention comprises, in one form thereof, an electrical assembly including a plurality of electrical modules, each of the plurality of electrical modules being sequentially electrically connected to at least one other of the plurality of electrical modules. Each of the plurality of electrical modules including a coding circuit, each of the coding circuits interacting to identify a number of the plurality of electrical modules that are sequentially electrically connected.

The present invention advantageously allows an installer to connect electrical receptacles in a sequential manner.

Another advantage is that only one type of interconnecting cable is necessary.

A further advantage of the present invention is that each of the receptacles can be identical.

A still further advantage of the present invention is that if more than a predetermined number of electrical receptacles are connected, the receptacles are disconnected from electrical power.

Yet another advantage of the present invention is that compliance with the electrical code is automatic.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
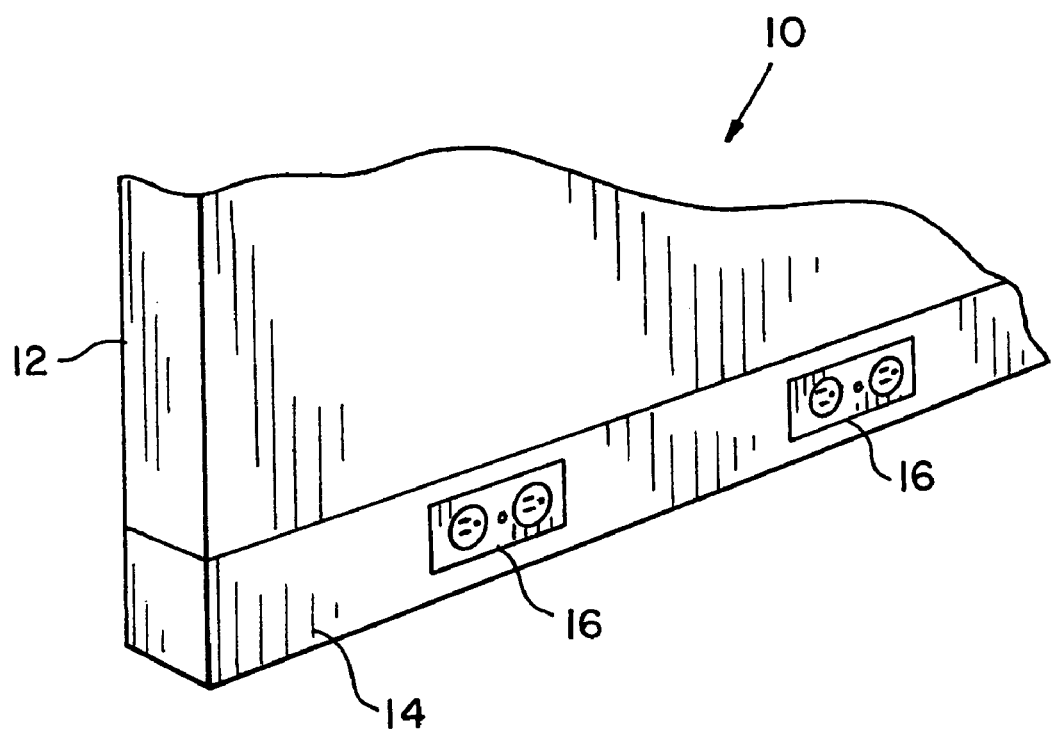
FIG. 1 is a perspective view of an embodiment of a modular wall panel system including a power distribution system having electrical receptacles of the present invention.

Referring now to the drawings, and more particularly to FIG. 1, there is shown a modular wall panel system 10 including a modular wall panel 12, a raceway 14 and next connect receptacle assemblies 16. Modular wall panel system 10 is utilized in a modem office space as partitioning walls in an open floor plan environment.

Figure 2:
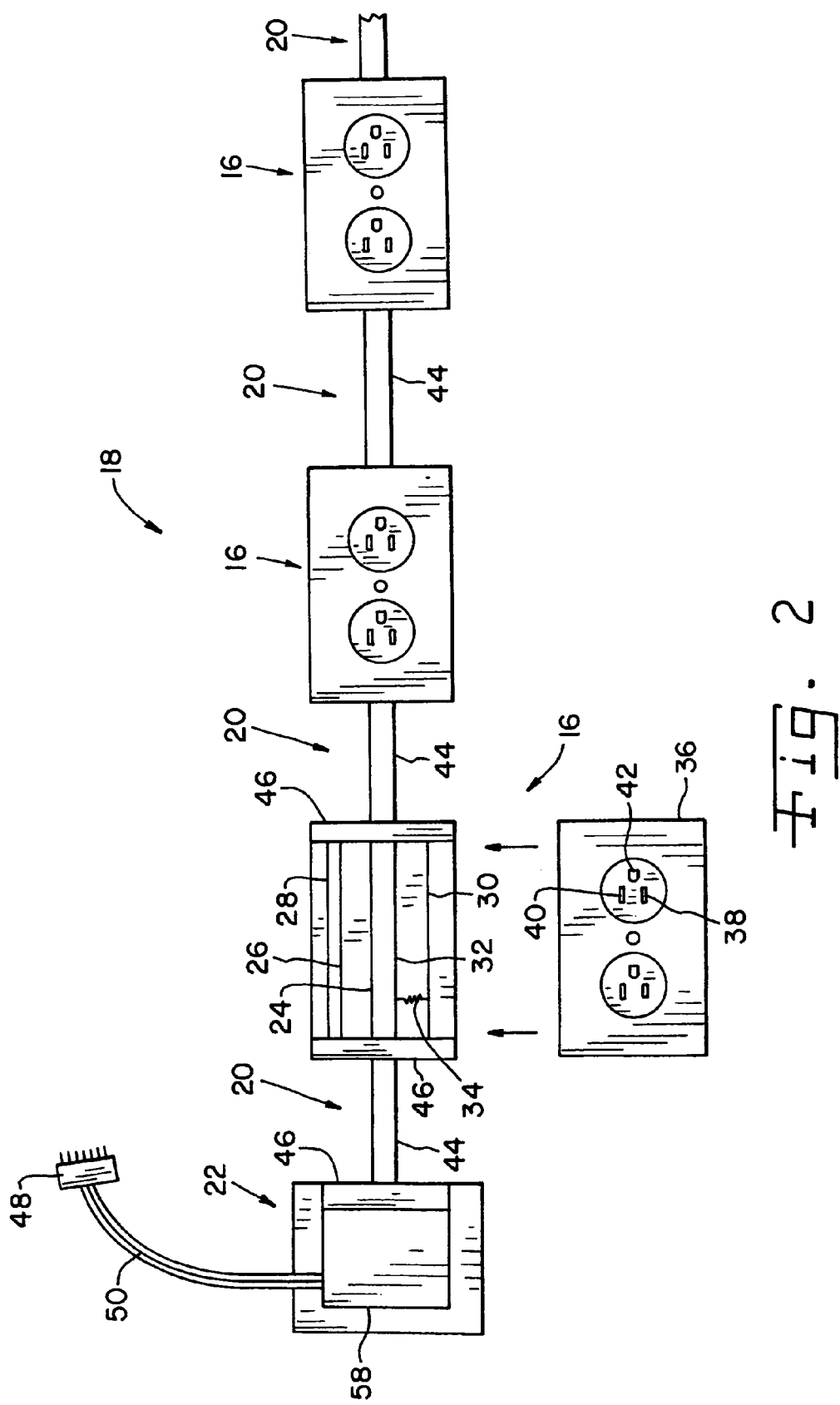
FIG. 2 is a block diagram of the power distribution assembly of the modular wall panel system of FIG. 1.
Figure 3:
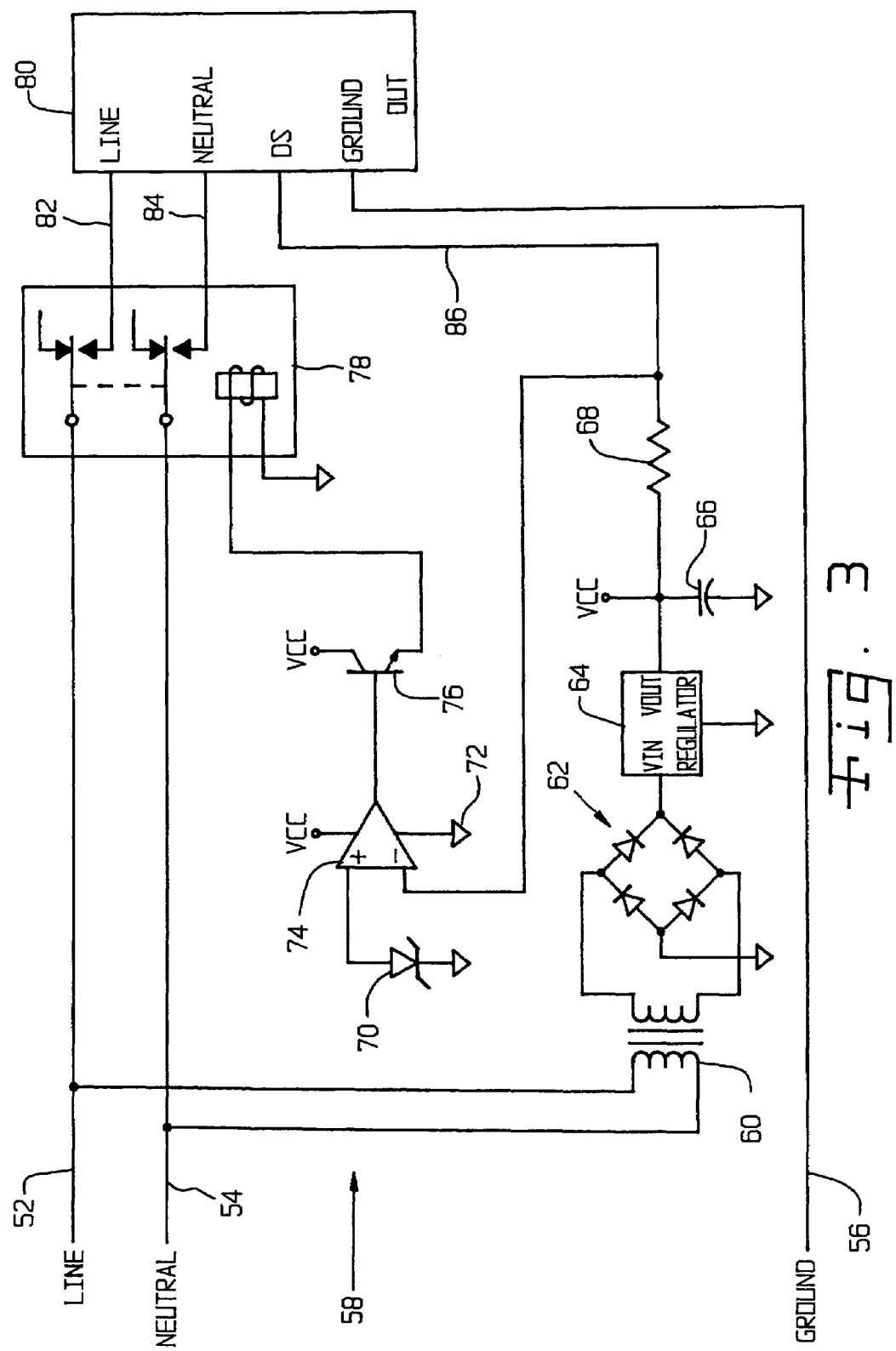
FIG. 3 is a schematic diagram of a circuit in the power distribution system of FIGS. 1 and 2.

Now, additionally referring to FIGS. 2 and 3, power distribution system 18, which is enclosed in raceway 14 is shown. Power distribution system 18 includes receptacle assemblies 16, cable assemblies 20 and circuit assembly 22. Cable assemblies 20 interconnect receptacle assemblies 16 with each other and a first receptacle assembly 16 to circuit assembly 22.

Receptacle assemblies 16 are electrical modules that include a line conductor 24, a neutral conductor 26, a ground conductor 28, a signal line 30, a signal line return 32, a circuit coding element 34, a cover plate 36, a neutral socket 38, a power socket 40 and a ground socket 42. Conductors 24, 26 and 28, as well as signal line 30 and return 32 are electrically connected to cable assembly 20. Further, line conductor 24 is electrically connected to power socket 40, supplying electrical power from line conductor 24 to power socket 40. In a like manner, neutral conductor 26 is electrically connected to neutral socket 38, thereby providing a return path for electrical power that is conveyed to power socket 40. Also in a like manner, ground conductor 28 is connected to ground socket 42. Circuit coding element 34 is electrically connected across signal line 30 and signal line return 32 to thereby provide information to circuit assembly 22. Circuit assembly 22 uses the information to determine the number of receptacle assemblies 16 sequentially connected to circuit assembly 22. Circuit coding element 34 is exemplified in the present invention as a resistor 34. Resistors 34, in each of the receptacle assemblies 16, are effectively connected in parallel to thereby alter the resistance between signal line 30 and signal line return 32, thereby providing information to circuit assembly 22 as to the number of circuit coding elements 34 and consequently the number of receptacle assemblies 16 connected sequentially thereto. Even though resistor 34 has been shown in receptacle assembly 16, other passive components or active components may be used to provide information by way of signal line 30 to circuit assembly 22.

Cable assembly 20 includes cable 44 and connector 46. Cable 44 has multiple conductors to accommodate the conveyance of electrical power and at least one signal. Connectors 46 are identical and connect with either end of receptacle assembly 16 or to circuit assembly 22. Cable assembly 20 is utilized to connect circuit assembly 22 to a receptacle assembly 16 as well as to interconnect sequential receptacle assemblies 16. Advantageously, cable assemblies 20 are identical and interchangeable, thereby reducing a need to inventory multiple cable configurations.

Plug 48 is connected to and provides electrical power to conductors 50 that pass the electrical power on to circuit assembly 22. Circuit assembly 22, also known as a control assembly 22, includes a line conductor 52, a neutral conductor 54, a ground conductor 56, and a circuit board assembly 58. Line, neutral and ground electrical connections are respectively electrically connected to conductors 50 to provide power to circuit assembly 22. Circuit board assembly 58 includes a transformer 60, a rectification circuit 62, a voltage regulator 64, a capacitor 66, a reference resistor 68, a voltage reference zener diode 70, a reference ground 72, an operational amplifier 74, a transistor 76, a relay 78 and a connector assembly 80. Connector assembly 80 interacts with, and is connected to, switched line conductor 82, switched neutral conductor 84 and signal line 86.

Electrical power is supplied to circuit assembly 22 by way of conductors 52 and 54. Transformer 60 is connected across line conductor 52 and neutral conductor 54 to provide electrical power to the sensing circuit contained on circuit board assembly 58. Incoming electrical power is transformed by transformer 60 to a lower voltage, which is then rectified by rectification circuit 62. Voltage regulator 64 takes the rectified power and regulates the output to a specific DC level. Capacitor 66 substantially removes AC ripple from the DC voltage line. The voltage therefrom is supplied to operational amplifier 74 and transistor 76. DC Voltage is also supplied to reference resistor 68. Signal line 86 is connected to one input of operational amplifier 74. The voltage on signal line 86 is the result of the voltage divided across resistor 86 that is in series with resistors 34 that are connected in parallel with each other. To another input of operational amplifier 74 there is connected zener reference diode 70, which establishes a voltage reference for operational amplifier 74. Operational amplifier 74, is operating as a comparator 74 in that comparator 74 is comparing the voltage received from signal line 86 to the voltage reference of zener diode 70. As long as the voltage present on signal line 86 exceeds the voltage from reference zener diode 70, operational amplifier 74 has a positive voltage output which supplies current to and drives transistor 76. Transistor 76 has a collector connected to the voltage output of regulator 64. The base of transistor 76 is connected to the output of operational amplifier 74. When operational amplifier 74 has a positive output and is driving the base of transistor 76, current is conducted through the collector and out the emitter of transistor 76, thereby driving a coil in relay 78. When the coil in relay 78 is energized, the normally open contacts, to which switched line conductor 82 and switched neutral conductor 84 are connected to conductors 82 and 84, are closed thereby electrically connecting line 52 to line 82 and neutral 54 to neutral 84.

The operation of power distribution system 18 is such that as additional receptacle assemblies 16 are sequentially connected, resistors 34 are added in parallel with each other thereby altering the voltage on signal line 86. As the voltage on signal line 86 is decreased to a point that it is less than the voltage from reference zener diode 70, then operation amplifier 74 goes to a low state causing transistor 76 to no longer conduct current therethrough. This then de-energizes the coil in relay 78 causing normally open contacts to return to an open position. This then deactivates all electrical receptacles 16 until the number of electrical receptacles 16, connected sequentially in power distribution system 18, is reduced to be equal to or less than a predetermined number. The predetermined number exemplified in the present invention is eight, therefore by adding a ninth electrical receptacle 16 to power distribution system 18 will cause circuit assembly 22 to deactivate all electrical receptacles 16 connected thereto. This advantageously, automatically prevents an installer from violating an electrical wiring code.

Connector 80 of circuit assembly 22 connects to connector 46 of a cable assembly 20. Signal line 86 of circuit assembly 22 is electrically connected to signal line 30 in each of receptacle assemblies 16. Signal line return 32 may be connected to either ground line 56 or a separate line provided by way of connector 80.

Although the sensing of the number of receptacles in the present invention has been described as measuring a voltage across parallel resistors 34 in receptacle assemblies 16, resistive element 34 can be replaced with inductive or capacitive elements. Measured variation in the inductive or capacitive elements can be accomplished by utilizing an alternating waveform and a voltage sensing circuit. Alternatively, active circuit elements can be used as coding element 34 in a similar manner to convey information to circuit assembly 22.

Alternatively, optic signals carried on fiber optic interconnections can be used instead of electrical ones to thereby determine the number of receptacle assemblies 16 that are sequentially connected. Coding elements 34 then would be in the form of optical elements that alter a signal on the fiber optic connection.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An electrical assembly, comprising:
   a plurality of electrical modules, each of said plurality of electrical modules being sequentially electrically connected to at least one other of said plurality of electrical modules, each of said plurality of electrical modules including a coding circuit, each of said coding circuits interacting to identify a number of said plurality of electrical modules that are sequentially electrically connected, said coding circuits being directly electrically connected in parallel.

2. The assembly of claim 1, wherein said coding circuit further comprises:
   at least one signal line; and
   a circuit element interacting with said signal line to alter a signal thereon.

3. The assembly of claim 2, wherein said circuit element is at least one of a resistor, a capacitor and an inductor.

4. The assembly of claim 3, wherein said circuit element is a resistor.

5. An electrical assembly comprising:
a plurality of electrical modules, each of said plurality of electrical modules being sequentially electrically connected to at least one other of said plurality of electrical modules, each of said plurality of electrical modules including a coding circuit, each of said coding circuits interacting to identify a number of said plurality of electrical modules that are sequentially electrically connected;
at least one signal line;
a circuit element interacting with said signal line to alter a signal thereon; and
a control assembly receiving said signal and activating said plurality of electrical modules if said signal indicates that said number is one of equal to and less than a predetermined number.

6. The assembly of claim 5, wherein said predetermined number is 8.

7. The assembly of claim 1, further comprising a plurality of substantially identical electrical cables sequentially electrically connecting said plurality of electrical modules.

8. The assembly of claim 7, wherein said plurality of electrical modules include electrical power receptacles.

9. A modular wall panel system, comprising:
at least one module wall panel;
at least one power delivery system being connected to at least one of said modular wall panels, said at least one power delivery system including:
a plurality of electrical modules, each of said plurality of electrical modules being sequentially electrically connected to at least one other of said plurality of electrical modules, each of said plurality of electrical modules including a coding circuit, each of said coding circuits interacting to identify a number of said plurality of electrical modules that are sequentially electrically connected, said coding circuits being directly electrically connected in parallel.

10. The system of claim 9, wherein said coding circuit further comprises:
at least one signal line; and
a circuit element interacting with said signal line to alter a signal thereon.

11. The system of claim 10, wherein said circuit element is at least one of a resistor, a capacitor and an indicator.

12. The system of claim 11, wherein said circuit element is a resistor.

13. A modular wall panel system comprising:
at least one module wall panel;
at least one power delivery system being connected to at least one of said modular wall panels, said at least one power delivery system including:
a plurality of electrical modules, each of said plurality of electrical modules being sequentially electrically connected to at least one other of said plurality of electrical modules, each of said plurality of electrical modules including a coding circuit, each of said coding circuits interacting to identify a number of said plurality of electrical modules that are sequentially electrically connected;
at least one signal line;
a circuit element interacting with said signal line to alter a signal thereon; and
a control assembly receiving said signal and activating said plurality of electrical modules if said signal indicates that said number is one of equal to and less than a predetermined number.

14. The system of claim 13, wherein said predetermined number is 8.

15. The system of claim 9, further comprising a plurality of substantially identical electrical cables sequentially electrically connecting said plurality of electrical modules.

16. The system of claim 15, wherein said plurality of electrical modules include electrical power receptacles.

17. A method of preventing activation of a predetermined number of electrical modules, comprising the steps of:
electrically powering a first electrical module;
electrically sequentially connecting a plurality of second electrical modules, at least one of said plurality of second electrical modules in communication with said first electrical module; and
determining within said first electrical module whether to electrically activate said plurality of second electrical modules.

18. The method of claim 17, further comprising the step of supplying information from at least one of said plurality of second electrical modules to said first electrical module.

19. The method of claim 18, wherein said determining step includes the substep of determining from said information a number of said plurality of second electrical modules that are in communication with said first electrical module.

20. The method of claim 19, further comprising the step of electrically activating said plurality of electrical modules if said number is one of less than and equal to a predetermined number.

21. The method of claim 20, wherein said predetermined number is 8.

* * * * *

UNITED STATES PATENT AND TRADEMARK OFFICE
CERTIFICATE OF CORRECTION

| | | |
|---|---|---|
| PATENT NO. | : 7,075,769 B2 | Page 1 of 1 |
| APPLICATION NO. | : 10/410548 | |
| DATED | : July 11, 2006 | |
| INVENTOR(S) | : Rupert et al. | |

It is certified that error appears in the above-identified patent and that said Letters Patent is hereby corrected as shown below:

COLUMN 2
    At line 30, please delete "modem", and substitute therefore --modern--.

Signed and Sealed this

Twenty-seventh Day of March, 2007

JON W. DUDAS
*Director of the United States Patent and Trademark Office*